United States Patent [19]

Nakamura et al.

[11] Patent Number: 4,971,749
[45] Date of Patent: Nov. 20, 1990

[54] NUCLEAR EXCITATION LASER TYPE INTRA-REACTOR NEUTRON FLUX MEASURING SYSTEM

[75] Inventors: Hisashi Nakamura, Oarai; Masaharu Nakazawa, Tokyo, both of Japan

[73] Assignee: Doryokuro Kakunenryo Kaihatsu Jigyodan, Tokyo, Japan

[21] Appl. No.: 437,717

[22] Filed: Nov. 17, 1989

[30] Foreign Application Priority Data

Nov. 18, 1988 [JP]  Japan .................. 63-292194

[51] Int. Cl.$^5$ .................. G21C 17/10; G01T 3/00
[52] U.S. Cl. .................. 376/254; 376/327; 376/326; 376/248; 376/154; 376/153
[58] Field of Search .................. 376/327, 326, 143, 248, 376/153, 154, 155, 254, 255

[56] References Cited

U.S. PATENT DOCUMENTS

| H407 | 1/1988 | George .................. | 376/326 |
| 3,110,656 | 11/1963 | Mills .................. | 376/326 |
| 3,309,622 | 3/1967 | Weiner et al. .................. | 376/326 |
| 3,383,509 | 5/1968 | Goldstein et al. .................. | 376/248 |
| 3,470,490 | 9/1969 | Held et al. .................. | 376/326 |
| 4,160,956 | 7/1979 | Fader .................. | 376/326 |
| 4,325,785 | 4/1982 | Klotz et al. .................. | 376/254 |

Primary Examiner—Harvey E. Behrend
Attorney, Agent, or Firm—Armstrong, Nikaido, Marmelstein et al.

[57] ABSTRACT

A nuclear excitation laser type intra-reactor neutron flux measuring system of this invention is comprised of a laser oscillator filled with a nuclear exciting gas such as $^3$He, KrF or XeF, mounted on the tip of a control rod. The nuclear exciting gas is made into a plasma by the neutrons or the fragments of fissioned nuclei when the tip is positioned in the reactor core by raising the control rod. Since the nuclear exciting gas made into a plasma itself generates a laser beam or amplifies a laser beam projected from the outside, the behavior of neutrons can be monitored in detail after guiding this light response to the light processing system located outside, distinguishing the energies of neutrons from the spectrum and calculating the density and the flux of the neutron in each energy. Furthermore, the detecting sensitivity can be enhanced by forming the responsive membrane made of $U_3O_8$ and so on, on the laser oscillator.

7 Claims, 2 Drawing Sheets

NUCLEAR EXCITATION LASER TYPE INTRA-REACTOR NEUTRON FLUX MEASURING SYSTEM

BACKGROUND OF THE INVENTION

1. Field of the Invention

This invention relates to an instrumentation for monitoring the neutron flux in a fast breeder reactor, a light-water reactor, a heavy-water reactor, a gas reactor, a fusion reactor and other types of reactors, and more particularly to a nuclear excitation laser type intra-reactor neutron flux measuring system in a nuclear reactor's instrumentation for the core and the upward section, such as a nuclear reactor control system utilizing instrumentation for monitoring the neutron flux, a monitoring system, an anomaly diagnosing system, a security system and so on, applying optical techniques.

2. Description of the Related Art

Hitherto, in order to ascertain the condition of a nuclear reactor core accurately and to improve its safety, the total density and the total flux of the neutrons within a specific area of the reactor core have been measured by determining the electric current, or by using a pulse type ionizing box to ascertain the behavior of the neutrons in the reactor based on the data obtained by measuring the total density and the total flux of the neutrons at various points in the reactor.

However, although the total density and the total flux of the neutrons at each point within a specific area in the reactor core could be measured, information regarding how the fast neutrons, the neutrons of medium speed and the thermal neutrons separately behave could not be obtained simply by distinguishing between these neutrons.

SUMMARY OF THE INVENTION

This invention was achieved to solve the above described problems. The object of this invention is to provide a nuclear excitation laser type intra-reactor neutron flux measuring system which increases the efficiency of a nuclear reactor by making it possible to ascertain the behavior of the neutron in the nuclear reactor accurately, thus enabling such a system to be operated more economically by eliminating the need to mount various instrumentation units, thus avoiding overinstallation, and increasing the safety of the reactor core by rapidly providing a comprehensive collection of detailed information regarding the inside of the reactor.

To this end, the nuclear excitation laser type intrareactor neutron flux measuring system of this invention has a laser oscillator mounted on the tip of each control rod which generates laser oscillation by nuclear excitation thereby making it possible to monitor the behavior of the neutrons in the reactor by measuring the spectrum of the laser beam. Further characteristics of this invention are enhanced detection sensitivity by forming a neutron responsive membrane made of $U_3O_8$ and so on, on the tube of the laser oscillator; a Fabry-Pérot type laser formed by a reflector mounted on the tip of the tube of the laser oscillator; use of $^3He$, KrF, XeF and so on as the nuclear exciting gases and a laser beam emitted through the control rod using optical fibers.

DETAILED DESCRIPTION OF THE PREFERRED EMBODIMENTS

The embodiments of this invention will be explained by referring to the following figures.

Figure 1:
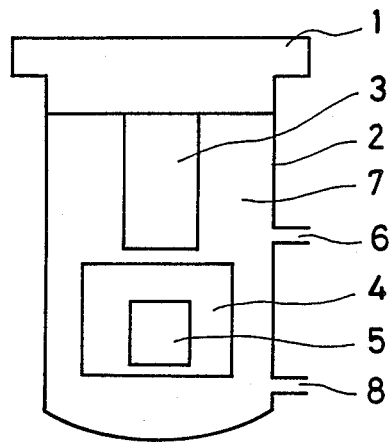
FIG. 1 shows the system of the fast breeder reactor.
Figure 3:
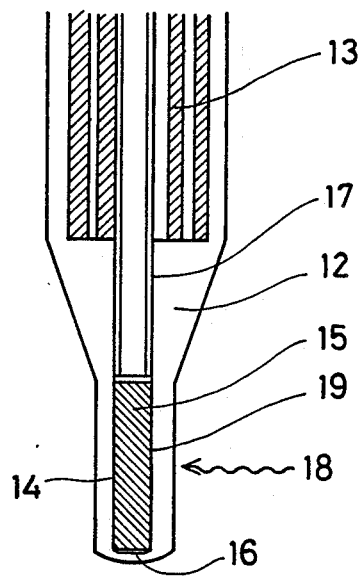
FIG. 3 shows one of the embodiments of the control rod using the nuclear excitation laser type intra-reactor neutron flux measuring system of this invention.
Figure 2:
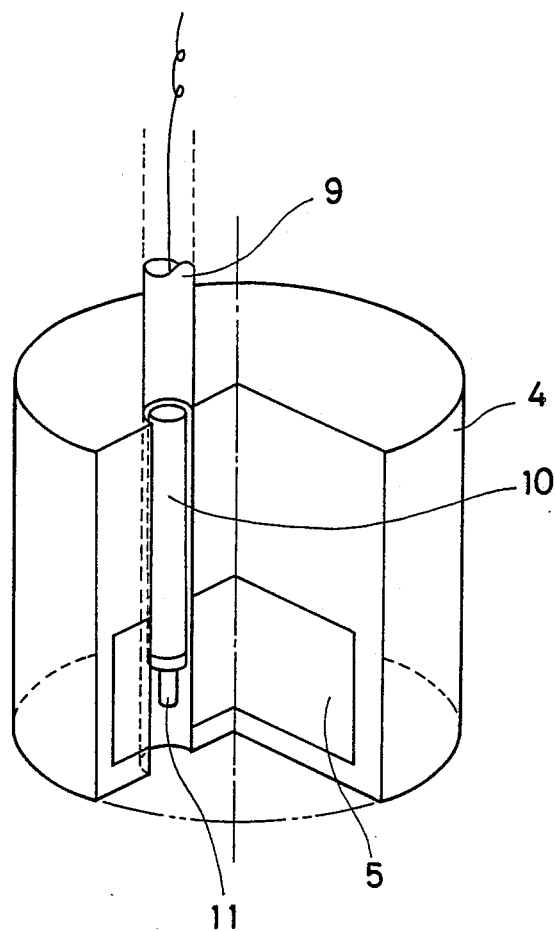
FIG. 2 shows the details of the vicinity of the reactor core barrel.

FIG. 1, FIG. 2 and FIG. 3 show the entire construction of the fast breeder reactor, the details of the vicinity of the reactor core barrel and one of the embodiments of the control rod using the nuclear excitation laser type intra-reactor neutron flux measuring system, respectively. The figures show a shielding plug 1, a reactor vessel 2, a mechanism of the upper section of the reactor core 3, a reactor core barrel 4, a reactor core 5, an outlet nozzle 6, an upper plenum of the reactor 7, an inlet nozzle 8, a mechanism for driving the control rods 9, a control rod 10, the tip of a control rod 11, a dash ram 12, a component of the control rod 13, a laser oscillator 14, a gas for nuclear excitation 15, a reflector 16, an optical tube 17, a neutron 18 and a responsive membrane 19.

In these figures, the fast breeder reactor, an example of a nuclear reactor, consists of a reactor vessel 2, a shielding plug 1, the mechanism of the upper section of the reactor core 3, the reactor core barrel containing the reactor core 4, and so on.

The control rod 10 driven by the control rod driving mechanism 9, contains a plurality of components of a control rod 13 made of boron carbide ($B_4C$), etc., and is moved upwards when the reactor is in operation and is moved downwards when the reactor is stopped. The laser oscillator 14 is mounted on the dash ram 12 at the tip 11 of the control rod 10, and the responsive membrane 19 made of uranium oxide ($U_3O_8$), etc., is formed on the laser tube. The tube is filled with the nuclear exciting gas, such as $^3He$, KrF or XeF, etc. The Fabry-Pérot type laser is constructed by mounting the reflector 16 on one end of the laser tube. The optical tube 17 made of optical fiber, etc., is mounted on another end of the laser tube and is connected to the optical processing system (not drawn) outside through the inside of the control rod 10.

In this construction, the control rod is raised when the reactor is in operation and the tip of the control rod is positioned at the reactor core. As a result, the nuclear exciting gas 15, with which the laser oscillating system 14 is filled, is excited and made into a plasma by the energy supplied from the nuclear reaction, i.e., the neutrons generated by the responsive membrane 19 or the fragments of fissioned nuclei. The nuclear exciting gas made into a plasma is excited and produces a stimulated emission and laser oscillation results. The oscillating wavelength of the laser at this time correspond to the energy of the neutrons which contribute to the excitation. Furthermore, it is possible to excite the gas by projecting the laser beam from the outside through the optical tube. The projected laser beam is then amplified.

Since the wavelength of the light emitted by the laser oscillator thus corresponds to the energy of the neutrons in the reactor, not only the total density and the total flux of the neutrons in the specific area measured in the reactor core 5 can be measured, but the various energies of the neutrons can also be distinguished and hence the density and the flux of the neutrons of various energies can be determined separately by introducing the laser beam to the external optical processing system through the optical tube 17 and analyzing the spectrum of the laser beam. Thus, it becomes possible to ascertain the behavior of the neutrons in the reactor in detail by making similar determinations at each point in the reactor.

Although sensitivity is enhanced by forming a responsive membrane on the laser tube in the above mentioned embodiment, the responsive membrane can be omitted when the oscillation can be generated by the neutrons or the fragments of the fissioned nuclei sent directly from the reactor.

Furthermore, this invention is not limited to use in fast breeder reactors. It is also applicable to the measurement of neutrons in light-water reactors, heavy-water reactors, gas reactors and fusion reactors. Needless to say, this invention can be applied to the general determination of common radioactive rays.

As above mentioned, this invention makes it possible not only to measure the total density and the total flux of the neutrons but also to distinguish between fast, medium and thermal neutron energies as well as to ascertain the behavior of each neutron in the reactor core in detail. Furthermore, extended supervisory range, elevated core combustion managing ability, and selective combustion become possible since the spectrum of the laser beam can be set in the wide range. These advantages not only extend the combustion rate of the core fuel but also enhance the economical operation of the nuclear reactor, etc., as a result of the increase in operational information.

Since the nuclear exciting laser performs the above functions by measuring light, a large quantity of signals regarding core information can be transmitted with high speed and high quality. As a result, since these advantages not only result in more economical operation by making it needless to mount various instrumentation units and therefore avoiding over installation, but also make it possible to monitor the reactor core rapidly and in detail, it is relatively easy to detect an anomaly of a specific area in the reactor at an early stage. The safety of the reactor can therefore be enhanced because these advantages make it easier to ascertain and manage the characteristics of the reactor core in operation.

What is claimed is:

1. A nuclear excitation laser type intra-reactor neutron flux measuring system comprising:
   a laser oscillator mounted on a tip of a control rod, capable of generating a laser oscillation by the nuclear excitation and monitoring the behavior of neutrons in a reactor by the spectrum of a laser beam.

2. A nuclear excitation laser type intra-reactor neutron flux measuring system according to claim 1 wherein a neutron responsive membrane is formed on a tube of said laser oscillator.

3. A nuclear excitation laser type intra-reactor neutron flux measuring system according to claim 2 wherein said responsive membrane is made of $U_3O_8$ and so on.

4. A nuclear excitation laser type intra-reactor neutron flux measuring system according to one of claims 1 and 2 wherein a reflector is mounted on a tip of said tube of said laser oscillator.

5. A nuclear excitation laser type intra-reactor neutron flux measuring system according to one of claims 1 and 2 wherein a nuclear exciting gas filled in said laser oscillator is made of one selected from a group including $^3$He, KrF and XeF.

6. A nuclear excitation laser type intra-reactor neutron flux measuring system according to one of claims 1 and 2 wherein a laser beam can be emitted through said control rod using an optical fiber.

7. A nuclear excitation laser type intra-reactor neutron flux measuring system according to one of claims 1 and 2 wherein said laser beam can be projected to said laser oscillator from outside using said optical fiber.

* * * * *